United States Patent
Wang et al.

(10) Patent No.: US 11,995,144 B2
(45) Date of Patent: May 28, 2024

(54) WEBPAGE ILLUSTRATION PROCESSING METHOD, SYSTEM, DEVICE AND STORAGE MEDIUM

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Xichen Wang, Beijing (CN); Zhentao Zhang, Beijing (CN); Zhidong She, Beijing (CN); Junwei Zhu, Beijing (CN); Gang Wang, Beijing (CN); Liang Zhang, Beijing (CN); Zhengfeng Rao, Beijing (CN)

(73) Assignees: BEIJING JINGDONG SHANGKE INFORMATION TECHNOLOGY CO. LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 418 days.

(21) Appl. No.: 17/297,273

(22) PCT Filed: Jan. 2, 2020

(86) PCT No.: PCT/CN2020/070016
§ 371 (c)(1),
(2) Date: May 26, 2021

(87) PCT Pub. No.: WO2020/181903
PCT Pub. Date: Sep. 17, 2020

(65) Prior Publication Data
US 2022/0027609 A1    Jan. 27, 2022

(30) Foreign Application Priority Data
Mar. 14, 2019   (CN) .......................... 201910192074.2

(51) Int. Cl.
*G06F 16/957*   (2019.01)
*G06F 18/214*   (2023.01)
(Continued)

(52) U.S. Cl.
CPC .......... *G06F 16/957* (2019.01); *G06F 18/214* (2023.01); *G06V 10/25* (2022.01);
(Continued)

(58) Field of Classification Search
CPC ...... G06V 10/82; G06V 10/774; G06V 10/25; G06V 20/30; G06V 30/413; G06F 16/957; G06F 18/214; G06Q 30/02; G06N 3/08
See application file for complete search history.

(56) References Cited

U.S. PATENT DOCUMENTS

| | | | |
|---|---|---|---|
| 9,665,959 B2 | 5/2017 | Hatano et al. | |
| 2018/0181842 A1 | 6/2018 | Liao et al. | |

FOREIGN PATENT DOCUMENTS

| | | |
|---|---|---|
| CN | 101807259 A | 8/2010 |
| CN | 104699837 A | 6/2015 |
| CN | 108229347 A | 6/2018 |

OTHER PUBLICATIONS

Chaudhuri A, Messina P, Kokkula S, Subramanian A, Krishnan A, Gandhi S, Magnani A, Kandaswamy V. A smart system for selection of optimal product images in e-commerce. In 2018 IEEE International Conference on Big Data (Big Data) Dec. 10, 2018 (pp. 1728-1736). IEEE. (Year: 2018).*
(Continued)

*Primary Examiner* — Vu Le
*Assistant Examiner* — Tracy Mangialaschi
(74) *Attorney, Agent, or Firm* — Oblon, McClelland, Maier & Neustadt, L.L.P.

(57) ABSTRACT

The processing method comprises: acquiring a first image set corresponding to a product category; labelling at least
(Continued)

one region of interest for each image in the first image set, wherein each region of interest is used for representing an object; acquiring a scanning window; using the scanning window to scan the regions of interest, acquiring scanning results, and placing the scanning results into a sample training set; establishing an illustration frame acquisition model by taking the first image set as input and taking the sample training set as output; acquiring an image to be processed, and using the illustration frame acquisition model to acquire a target webpage illustration frame corresponding to the image to be processed; and cutting, according to the target webpage illustration frame, the image to be processed so as to obtain a target webpage illustration.

20 Claims, 5 Drawing Sheets

(51) Int. Cl.
*G06V 10/25* (2022.01)
*G06V 10/774* (2022.01)
*G06V 10/82* (2022.01)
*G06V 20/30* (2022.01)
*G06V 30/413* (2022.01)

(52) U.S. Cl.
CPC ............ *G06V 10/774* (2022.01); *G06V 10/82* (2022.01); *G06V 20/30* (2022.01); *G06V 30/413* (2022.01)

(56) References Cited

OTHER PUBLICATIONS

Wang, Wenguan, and Jianbing Shen. "Deep cropping via attention box prediction and aesthetics assessment." Proceedings of the IEEE international conference on computer vision. 2017. (Year: 2017).*

Extended European Search Report issued on Jun. 30, 2022 in European Patent Application No. 20769750.9, 13 pages.

Wang et al., "Deep Cropping via Attention Box Prediction and Aesthetics Assessment", 2017 IEEE International Conference on Computer Vision (ICCV), IEEE, Oct. 22, 2017, pp. 2205-2213, XP033283083 (9 total pages).

International Search Report issued Apr. 8, 2020 in PCT/CN2020/070016, 2 pages.

* cited by examiner

WEBPAGE ILLUSTRATION PROCESSING METHOD, SYSTEM, DEVICE AND STORAGE MEDIUM

The present application claims priority to CN patent application No. 201910192074.2 filed on Mar. 14, 2019, the content of which is hereby incorporated therein by reference in its entirety.

TECHNICAL FIELD

The present disclosure relates to the field of image processing, and more particularly to a webpage illustration processing method, system, device, and storage medium.

BACKGROUND

In the field of Internet, it may need to edit and product a significant number of webpage copywriting (such as, contents comprising product images and product descriptions) to introduce a product to consumers for reference, and guide the consumers to purchase products and consume services. However, edition of a large number of webpages needs to consume a lot of times and economic costs, especially for cutting and selection of images from photographs captured in the natural scene.

The existing webpage illustration processing methods mainly include:

1) Use a SVM (Support Vector Machine) Machine learning to perform model training and selection of image automatic points of interest so as to select image local points of interest; however, this method does not use relevant algorithms such as deep learning, resulting in poor accuracy;

2) a system which automatically selects background images for the Internet promotional articles by the crawler and the method of text classification and depth learning; however, this method is only available for providing illustrations for soft introductory articles under broad Internet crawling, without considering a case of reasonably cutting an original image due to inappropriate image size.

SUMMARY

The technical problem to be solved by the present disclosure is that the webpage illustration processing method in the existing art is not able to directly cut a target illustration from an image of the original natural scene so as to satisfy the defects such as webpage editing requirements, etc., and the object is to provide a webpage illustration method, system, device, and storage medium.

The present disclosure solves the above technical problem by the following technical solutions:

According to one aspect of the present disclosure, there provides a webpage illustration processing method, and the processing method comprises:

acquiring a first image set corresponding to a product category;
labelling at least one region of interest for each image in the first image set, wherein each region of interest is used for representing an object;
acquiring a scanning window;
using the scanning window to scan the regions of interest, acquiring scanning results, and placing the scanning results into a sample training set;
establishing an illustration frame acquisition model by taking the first image set as input and taking the sample training set as output;

acquiring an image to be processed, and using the illustration frame acquisition model to acquire a target webpage illustration frame corresponding to the image to be processed; and
cutting the image to be processed according to the target webpage illustration frame so as to obtain a target webpage illustration.

Preferably, the step of acquiring a first image set corresponding to a product category comprises:

acquiring an initial image set;
cleansing images in the initial image set;
labelling ID information (identification information) of the cleansed images in the initial image set;
associating the ID information with multi-dimensional information of images, and acquiring the first image set corresponding to the product category based on the associated images;
wherein, the multi-dimensional information includes at least one of the product category to which the images belong, width, height, storage position, and source information.

Preferably, when the multi-dimensional information comprises the product category to which the images belong, the step of acquiring the first image set corresponding to the product category based on the associated images comprises:

calculating a first ratio of the number of images in the initial image set belonging to the product category to the total number of images in the initial image set;
judging whether the first ratio exceeds a first set threshold or not, and
if it exceeds, selecting the images of the product category as the first image set.

Preferably, the scanning window includes a plurality of target scanning windows having the same aspect ratios and different sizes.

The step of using the scanning window to scan the regions of interest, acquiring scanning results, and placing the scanning results into a sample training set comprises:

using each of the target scanning windows to scan the regions of interest in images in the first image set, acquiring scanning results, and placing the scanning results into a sample training set.

Preferably, the step of using each of the target scanning windows to scan the regions of interest in images in the first image set, acquiring scanning results, and placing the scanning results into a sample training set comprises:

judging whether the region of interest corresponds to the product category or not;
if not, continuing to scan the next region of interest; and
if so, calculating a second ratio of the area of intersection between the target scanning window and the region of interest to the area of the region of interest, and when the second ratio is greater than or equal to a second set threshold, then labelling the region of interest as a first attribute; when the second ratio is smaller than the second set threshold and greater than zero, then labelling the region of interest as a second attribute; when the second ratio is zero, labelling the region of interest as a third attribute;
when there is at least one region of interest corresponding to the first attribute but no region of interest corresponding to the second attribute in the images in the first image set, taking parameter values of the target scanning window as positive samples;
when there is at least one region of interest corresponding to the second attribute in the images in the first image set, taking parameter values of the target scanning window as negative samples;

wherein, the parameter values include central coordinates, width, and height of the target scanning window;

A plurality of the positive samples constitute a positive sample set, and a plurality of the negative samples constitute a negative sample set, the positive set and the negative set constitute the sample training set.

Preferably, the target scanning windows of different sizes traverse the regions of interest in the images in the first image set along a set scanning path in a set scanning step.

Preferably, the processing method further comprises:
calculating a first number of the positive samples in the positive sample set and a second number of the negative samples in the negative sample set;
when the first number is larger than a third set threshold, excluding a first set number of the positive samples randomly, until the first number is less than or equal to the third set threshold;
when the second number is larger than the third set threshold, excluding a second set number of the negative samples randomly, until the second number is less than or equal to the third set threshold.

Preferably, the step of establishing an illustration frame acquisition model by taking the first image set as input and taking the sample training set as output comprises:
establishing the illustration frame acquisition model by utilizing a target detection algorithm with taking the first image set as input and taking the sample training set as output.

Preferably, the method further comprises, after the step of establishing the illustration frame acquisition model by utilizing a target detection algorithm with taking the first image set as input and taking the sample training set as output:
correcting the target detection algorithm so that the illustration frame acquisition model outputs an illustration frame with the same aspect ratio as that of the target webpage illustration.

Preferably, the method further comprises, after the step of acquiring the first image set corresponding to the product category based on the associated images:
classifying the images in the first image set coarsely to obtain classification results;
wherein, classification conditions for the coarse classification include being suitable for webpage illustration, being not suitable for webpage illustration and belonging to a white background image;
establishing an illustration classification model by taking the images in the initial image set as input and taking the classification results as output.

The step of acquiring an image to be processed, and using the illustration frame acquisition model to acquire a target webpage illustration frame corresponding to the image to be processed comprise:
acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed;
filtering a candidate illustration frame with a width greater than or equal to the width of the target webpage illustration from candidate illustration frames as the target webpage illustration frame.

Preferably, the step of acquiring the target webpage illustration corresponding to the image to be processed according to the target webpage illustration frame includes:
cutting the image to be processed according to the target webpage illustration frame to obtain a candidate picture;
zooming in or zooming out the candidate picture to obtain the target webpage illustration with a target width and a target height.

According to another aspect of the present disclosure, there further provides a webpage illustration processing system, comprising a first image set acquisition module, a region of interest acquisition module, a scanning window acquisition module, a training sample set acquisition module, an illustration frame model establishment module, an illustration frame acquisition module, and a webpage illustration acquisition module;
the first image set acquisition module is used for acquiring a first image set corresponding to a product category;
the region of interest acquisition module is used for labelling at least one region of interest for each image in the first image set, wherein each region of interest is used for representing an object;
the scanning window acquisition module is used for acquiring a scanning window;
the training sample set acquisition module is used for using the scanning window to scan the regions of interest, acquiring scanning results, and placing the scanning results into a sample training set;
the illustration frame model establishment module is used for establishing an illustration frame acquisition model by taking the first image set as input and taking the sample training set as output;
the illustration frame acquisition module is used for acquiring an image to be processed, and using the illustration frame acquisition model to acquire a target webpage illustration frame corresponding to the image to be processed; and
the webpage illustration acquisition module is used for cutting the image to be processed according to the target webpage illustration frame so as to obtain a target webpage illustration.

Preferably, the first image set acquisition module comprises an initial image set acquisition unit, an image cleansing unit, an image labelling unit, an information association unit and a first image set acquisition unit;
the initial image set acquisition unit is used for acquiring an initial image set;
the image cleansing unit is used for cleansing images in the initial image set;
the image labelling unit is used for labelling ID information of the cleansed images in the initial image set;
the information association unit is used for associating the ID information with multi-dimensional information of images, and the first image set acquisition unit is invoked for acquiring the first image set corresponding to the product category based on the associated images;
wherein, the multi-dimensional information includes at least one of the product category to which the image belongs, width, height, storage position, and source information.

Preferably, when the multi-dimensional information comprises the product category to which the image belongs, the first image set acquisition unit comprises a calculation sub-unit, and a judgement sub-unit;
the calculation sub-unit is used for calculating a first ratio of the number of images in the initial image set belonging to the product category to the total number of images in the initial image set;

the judgement sub-unit is used for judging whether the first ratio exceeds a first set threshold or not, and if it exceeds, selecting the images of the product category as the first image set.

Preferably, the scanning window includes a plurality of target scanning windows having the same aspect ratios and different sizes;

A training sample set acquisition module is used for using each of the target scanning windows to scan the regions of interest in images in the first image set, acquiring scanning results, and placing the scanning results into a sample training set.

Preferably, the training sample set acquisition module comprises a judgement unit, a ratio calculation unit, an attribute labelling unit, a positive sample acquisition unit and a negative acquisition unit;

the judgement unit is used for judging whether the region of interest corresponds to the product category or not; and if not, it continues to scan the next region of interest; and if so, the ratio calculation unit is invoked for calculating a second ratio of the area of intersection between the target scanning window and the region of interest to the area of the region of interest, and when the second ratio is greater than or equal to a second set threshold, then the attribute labelling unit is invoked for labelling the region of interest as a first attribute; when the second ratio is smaller than the second set threshold and greater than zero, then the attribute labelling unit is invoked for labelling the region of interest as a second attribute; when the second ratio is zero, the attribute labelling unit is invoked for labelling the region of interest as a third attribute;

the positive sample acquisition unit is used for when there is at least one region of interest corresponding to the first attribute but no region of interest corresponding to the second attribute in the images in the first image set, taking parameter values of the target scanning window as positive samples;

the negative sample acquisition unit is used for when there is at least one region of interest corresponding to the second attribute in the images in the first image set, taking parameter values of the target scanning window as negative samples;

wherein, the parameter values include central coordinates, width, and height of the target scanning window;

A plurality of the positive samples constitute a positive sample set, and a plurality of the negative samples constitute a negative sample set, the positive set and the negative set constitute the sample training set.

Preferably, the target scanning windows of different sizes traverse the regions of interest in the images in the first image set along a set scanning path in a set scanning step.

Preferably, the processing system comprises a number calculation module and a sample excluding module;

the number calculation module is used for calculating a first number of the positive samples in the positive sample set and a second number of the negative samples in the negative sample set;

the sample excluding module is used for when the first number is larger than a third set threshold, excluding a first set number of the positive samples randomly, until the first number is less than or equal to the third set threshold;

the sample excluding module is further used for when the second number is larger than the third set threshold, excluding a second set number of the negative samples randomly, until the second number is less than or equal to the third set threshold.

Preferably, the illustration frame model establishment module establishes the illustration frame acquisition model by utilizing a target detection algorithm with taking the first image set as input and taking the sample training set as output.

Preferably, the processing system further comprises a correction module;

the correction module is used for correcting the target detection algorithm so that the illustration frame acquisition model outputs an illustration frame with the same aspect ratio as that of the target webpage illustration.

Preferably, the processing system further comprises an image coarse classification module and an illustration classification model establishment module;

the image coarse classification module is used for classifying the images in the first image set coarsely to obtain classification results;

wherein, classification conditions for the coarse classification include being suitable for webpage illustration, being not suitable for webpage illustration and belonging to a white background image;

the illustration classification model establishment module is used for establishing an illustration classification model by taking the images in the initial image set as input and taking the classification results as output;

the illustration frame acquisition module comprises a candidate illustration frame acquisition unit and a filtering unit;

the candidate illustration frame acquisition unit is used for acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed;

the filtering unit is used for filtering a candidate illustration frame with a width greater than or equal to the width of the target webpage illustration from candidate illustration frames as the target webpage illustration frame.

Preferably, the webpage illustration acquisition module comprises a candidate picture acquisition unit and a zooming unit;

the candidate picture acquisition unit is used for cutting the image to be processed according to the target webpage illustration frame to obtain a candidate picture;

the zooming unit is used for zooming in or zooming out the candidate picture to obtain the target webpage illustration with a target width and a target height.

According to another aspect of the present disclosure, there further provides an electronic device comprising a memory, a processor, a computer program which is stored on the memory and can run on the processor, the processor executing the computer program to implement the above-described webpage illustration processing method.

According to another aspect of the present disclosure, there further provides a computer readable storage medium that stores a computer program thereon, which, when executed by the processor, implements the steps of the above-described webpage illustration processing method.

The positive and progressive effect can be achieved by the present disclosure is:

In the present disclosure, through a depth learning algorithm for image detection and classification, it is possible to directly cut a target illustration suitable for the webpage illustration from an original natural scene image, so as to reduce the step of manual labelling while ensuring availability of the target illustration, so that the time cost is reduced and the work efficiency is improved.

DETAILED DESCRIPTION OF EMBODIMENTS

Embodiment 1

Figure 1:
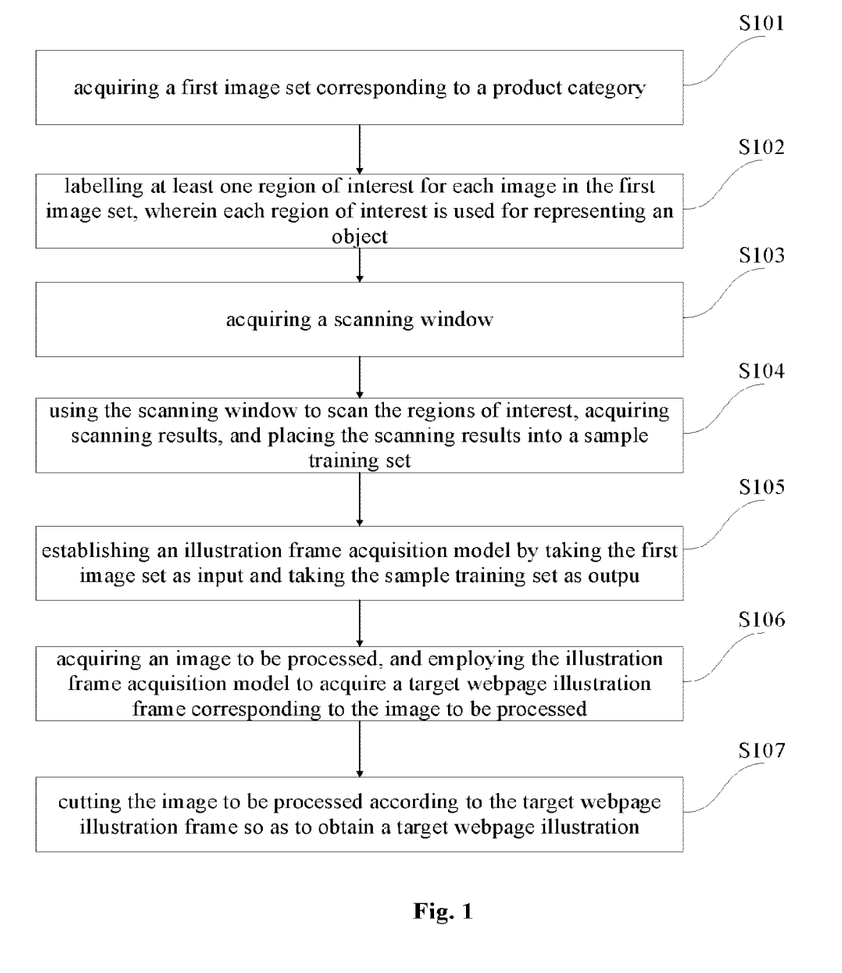
FIG. 1 is a flowchart of a webpage illustration processing method according to Embodiment 1 of the present disclosure.

As shown in FIG. 1, the webpage illustration processing method of the present embodiment includes:

S101, acquire a first image set corresponding to a product category; Among them, the product category includes a variety of categories, such as "mobile phones", "dress", etc., which are provided to users as reference to purchase.

S102, label at least one region of interest for each image in the first image set, wherein each region of interest is used for representing an object;

Among them, the same object in the region of interest includes a face, mobile phone, dress, etc. in an image, and corresponding parameter information of each region of interest (such as the central coordinates, width, height, information about the category to which it belongs, etc.) is associated with images in the first image set, and the association result is stored into a disk or another storage system.

S103, acquire a scanning window;

S104, use the scanning window to scan the regions of interest, acquire scanning results, and place the scanning results into a sample training set;

S105, establishes an illustration frame acquisition model by taking the first image set as input and taking the sample training set as output;

S106, acquires an image to be processed, and uses the illustration frame acquisition model to acquire a target webpage illustration frame corresponding to the image to be processed;

S107, cuts the image to be processed according to the target webpage illustration frame so as to obtain a target webpage illustration.

The webpage illustration processing method in the present embodiment belongs to an end-to-end (i.e., from an original natural scence image to a target webpage illustration) image processing method, that is, through a depth learning algorithm for image detection and classification, it is possible to directly cut a target illustration with fixed size suitable for the webpage illustration from the original natural scene image, so as to reduce the step of manual labelling while ensuring availability of the target illustration, so that the time cost is reduced and the work efficiency is improved.

Embodiment 2

Figure 2:
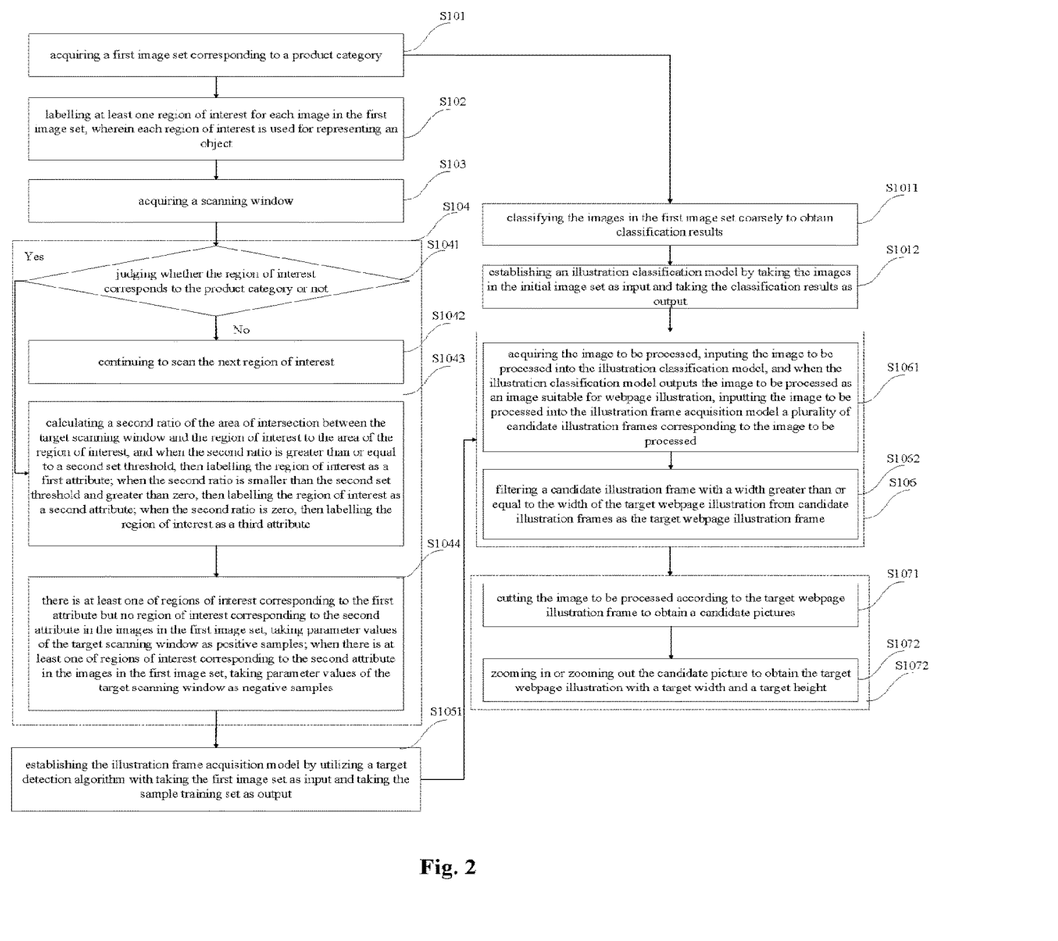
FIG. 2 is a flowchart of a webpage illustration processing method according to Embodiment 2 of the present disclosure.

As shown in FIG. 2, the webpage illustration processing method of the present embodiment further improves the embodiment 1, and specifically:

Step S101 includes:

acquire an initial image set;

cleanse images in the initial image set;

labels ID information of the cleansed images in the initial image set;

associate the ID information with multi-dimensional information of image, and acquiring the first image set corresponding to the product category based on the associated images;

wherein, the multi-dimensional information includes at least one of the product category to which the image belongs, width, height, storage position, and source information.

When the multi-dimensional information comprises the product category to which the image belongs, a first ratio of the number of images in the initial image set belonging to the product category to the total number of images in the initial image set is calculated;

It is judged whether the first ratio exceeds the first set threshold or not, and if exceeds, the images of the product category are selected to contitute the first image set.

After step S101 and before step S106, the method further includes:

S1011, classifies the images in the first image set coarsely to obtain classification results;

wherein, classification conditions for the coarse classification include, not being limited to, being suitable for webpage illustration, being not suitable for webpage illustration and belonging to a white background image;

An image being not suitable for webpage illustration includes, not being limited to, an image completely irrelevant to the product category, an image with obvious post-processing effects, an image including illegal contents such as eroticism, violence, etc.

S1012, establishes an illustration classification model by taking the images in the initial image set as input and taking the classification results as output.

Specifically, the illustration classification model is established by utilizing a neural network algorithm with taking the images in the first image set as input and taking the classification results as output, the establishment of the illustration classification model is implemented based on a software framework in the neural network algorithm such as Tensorflow, Pytorch, Caffee, SQUEEZENET, VGG and so on (Tensorflow, Pytorch, Caffe, SQUEEZENET, VGG are various data processing frameworks in the neural network algorithm), a hardware framework such as CPU (central processor), GPU (graphics processor), FPGA (field programmable gate array), dedicated AI calculation chip (artificial intelligence calculation chip) and so on, and each illustration classification model is only for classification of images of one product category.

Additionally, the scanning window includes a plurality of target scanning windows having the same aspect ratios and different sizes, and the target scanning window has the same aspect ratio as that of the target webpage illustration.

The target scanning windows of different sizes traverse the regions of interest in the images in the first image set along a set scanning path in a set scanning step.

Specifically, step 104 specifically includes:

S1041, it is judged whether or not the region of interest corresponds to the product category, if not, step S1042 is performed; if so, step S1043 is performed;

For example, when the product category is "mobile phone", if the object in the region of interest is a mobile phone, it is determined whether the region of interest corresponds to the product category or not. If the object in the region of interest is a face, it is determined whether the region of interest does not correspond to the product category or not.

S1042, continue to scan the next region of interest;

S1043, calculate a second ratio of the area of intersection between the target scanning window and the region of interest to the area of the region of interest, and when the second ratio is greater than or equal to a second set threshold, then labels the region of interest as a first attribute; when the second ratio is smaller than the second set threshold and greater than zero, then labels the region of interest as a second attribute; when the second ratio is zero, labels the region of interest as a third attribute;

Wherein the second set threshold can be specifically configured according to actual needs, and the configuration files are stored into a corresponding disk or another storage system.

S1044, when there is at least one region of interest corresponding to the first attribute but no region of interest corresponding to the second attribute in the images in the first image set, takes parameter values of the target scanning window as positive samples;

when there is at least one region of interest corresponding to the second attribute in the images in the first image set, takes parameter values of the target scanning window as negative samples;

wherein, the parameter values include central coordinates, width, and height of the target scanning window;

A plurality of the positive samples constitute a positive sample set, and a plurality of the negative samples constitute a negative sample set, the positive set and the negative set constitute the sample training set.

Furthermore, after acquiring the sample training set, calculates a first number of the positive samples in the positive sample set and a second number of the negative samples in the negative sample set;

when the first number is larger than a third set threshold, excludes a first set number of the positive samples randomly, until the first number is less than or equal to the third set threshold;

when the second number is larger than the third set threshold, excludes a second set number of the negative samples randomly, until the second number is less than or equal to the third set threshold.

Step S105 specifically includes:

S1051, establishes an illustration frame acquisition model by utilizing a target detection algorithm with taking the first image set as input and taking the sample training set as output.

Among them, the target detection algorithm is corrected to allow the illustration frame acquisition model to output an illustration frame with the same aspect ratio as that of the target webpage illustration, so that it is ensured zooming the cut image does not result in image deformation.

The target detection algorithms include, but not limited to, FASTER-RCNN algorithm (a machine learning algorithm), and by setting the maximum number of model training rounds (the specific number of training rounds can be accordingly set according to the characteristics of the actual image set), taking the first image set as input, taking the sample training set as output, and based on a software framework in the neural network algorithm such as Tensorflow, Pytorch, Caffee, SQUEEZENET, VGG and so on, a hardware framework such as CPU, GPU, FPGA, dedicated AI calculation chip and so on, the illustration frame acquisition model is established.

Step S106 includes:

S1061, acquire the image to be processed, inputs the image to be processed into the illustration classification model, and when the illustration classification model outputs the image to be processed as an image suitable for webpage illustration, inputs the image to be processed into the illustration frame acquisition model to obtain a plurality of candidate illustration frames corresponding to the image to be processed;

That is, after the illustration classification model confirms the image to be processed is suitable for an image for webpage illustration, the image to be processed is cut subsequently to obtain the target webpage illustration, so that the efficiency and processing speed of acquiring the target illustration webpage illustration can be improved effectively.

S1062, filters a candidate illustration frame with a width greater than or equal to the width of the target webpage illustration from candidate illustration frames as the target webpage illustration frame.

Among them, the corresponding central coordinates, width, height of each target webpage illustration frame are associated with the ID information about the image to be processed.

Taking into account that the image cut by means of a candidate illustration frame which is too small may become too blur after amplification and is not suitable for the target webpage illustration, it needs to delete the images with too small width.

Step S107 includes:

S1071, cuts the image to be processed according to the target webpage illustration frame to obtain a candidate picture;

S1072, zooms in or zooms out the candidate picture to obtain the target webpage illustration with a target width and a target height.

In addition, the target webpage illustration is intended to be stored in a disk or another storage system, that is, is put into a backup webpage illustration pool for usage in the subsequent webpage edition process.

The ID information corresponding to each target webpage illustration is labeled, and the ID information corresponding to target webpage illustrations and the information associated with their save paths are stored in the disk or other storage systems.

Hereinafter specific description will be presented in combination with examples:

1) Use the product category (such as "Mobile phone", "Dress", etc.) as a search condition, crawl and download related images from web pages in a specific website, or purchase and download natural scence images of related product categories from websites such as photography and so on, and record the link to an original web page corresponding to each image and its source information (for example, records the image originates from a certain website), forming an initial image set, i.e. an image material library.

2) Cleanse each image in the initial image set, for example: deleting an image in the initial image set whose aspect ratio is too large or too small, deleting an image in the initial image set whose width is smaller than a first set pixel distance (which can be set depending on a specific situation), deleting an image in the initial image set whose height is less than a second set pixel distance (which can be set depending on a specific situation), deleting a error image that cannot be opened normally, and utilizing a hash signature algorithm (such as a MD5 message summary algorithm, etc.) to process the images in the initial image set, deleting a plurality of same images from the initial image set and remaining only one corresponding image.

3) Label the ID information about the cleansed images in the initial image set, and associate the ID information with the product category to which the images belong, width, height, storage location, and source information of the images, etc.;

4) Pick out all images in the initial image set belonging to a product category whose proportion exceeds a first set threshold (such as 10%) to constitute a first image set.

5) Coarsely classify the images in the first image set according to suitable for webpage illustration, not suitable for webpage illustration, and belong to the white background image, and obtains classification results;

An illustration classification model is established by taking the images in the initial image as input and taking the classification results as output;

6) Label a region of interest in each image in the first image set which represents the same object (face, mobile phone, dress, etc.);

7) Select a target scanning window from a plurality of target scanning windows to scan the regions of interest in all images in the first image set:

For example: assuming that a target webpage illustration has a width of W and a height of H, a target scanning window has a weight of $W_1 = W*f$ and a height of $H_1 = H*f$; an image removed from the first image set is M (its width is T, the height is G); the initial coordinates of the target scanning window are $(W_1/2, H_1/2)$, the endpoint coordinates of the target scanning window are $(T-W_1/2, G-H_1/2)$, and the scanning step is a 2-pixel distance (the scanning step can be set according to the actual situation).

Assuming the current goal is to acquire a target webpage illustration related to a mobile phone, it is judged whether a region of interest in the current image corresponds to the mobile phone, and if not, continue to scan the next region of interest;

If is, it is calculated, when the target scanning window F scans the region of interest C, each second ratio v of the area of intersection Q between the target scanning window F and the region of interest C to the area of the region of interest C, and if $v \leq 0.75$, the region of interest in the current image is labeled as "positive" attribute, if $0<v<0.75$, the region of interest in the current image is labeled as "negative" attribute, and if $v=0$, the region of interest in the current image is labeled as "no care" attribute.

It is judged that after the current target scanning window F scans all images in the first image set, whether attributes corresponding to all regions of interest C in the image have the "negative" attribute, if have, the central coordinates, width and height of the target scanning window F are taken as negative samples; if attributes corresponding to all regions of interest C in the image have no "negative" attribute and are not all "no care" attributes, the central coordinates, width and height of the target scanning window F are taken as positive samples; and if attributes corresponding to all regions of interest C in the image each is the "no care" attribute, the target scanning window F is discarded, that is, not a positive sample nor a negative sample.

In addition, if all of the regions of interest C in the current image each does not correspond to the product category, the target scanning window F is discarded, that is, not a positive sample nor a negative sample.

It continues to employ each of the remaining target scanning windows to traverse the regions of interest in all images in the first image one by one, and finally acquires all positive samples as a positive sample set, and acquires all negative samples as a negative sample set.

In addition, when the positive samples in the positive sample set and the negative samples in the negative sample set is excessive (such as >300), it needs to randomly eliminate some positive samples in the positive sample set and some negative samples in the negative sample set, so that the positive samples in the positive sample set and the negative samples in the negative sample set each is less than 300 to ensure the data processing speed.

The positive sample set, negative sample set, and ID information about images in the first image set are associated and stored into a disk or another storage systems.

8) Modify the target detection algorithm (such as the Faster-RCNN algorithm) to ensure that the illustration frame acquisition model outputs an illustration frame having the same aspect ratio as that of the target webpage illustration, and can output multiple candidate illustration frames having different size and the same aspect ratio; for example: when the target detection algorithm is not corrected, the correction parameters corresponding to the illustration frame output from the illustration frame acquisition model are: the central coordinate offset parameter $(\Delta x, \Delta y)$, width and height correction parameter $(\Delta w, \Delta h)$, and after the target detection algorithm is corrected, the correction parameters corresponding to the candidate illustration frame output from the illustration frame acquisition model are: the central coordinate offset parameter $(\Delta x, \Delta y)$, the width and height correction parameter is $(\Delta W, (1/J)*\Delta w)$, J is the target aspect ratio coefficient, so that the corrected change amount for the height portion automatically changes to the target aspect ratio coefficient multiplied by the corrected change amount for width, thereby ensuring the candidate frame output from the illustration frame acquisition model, after correction, can meet the aspect ratio of the target webpage illustration.

In addition, the candidate illustration frame acquisition model is saved to a disk or another storage system.

9) when an image to be processed is acquired and input into the illustration classification model, and the illustration classification model outputs the image to be processed as an image suitable for webpage illustration, inputs the image to be processed into the illustration frame acquisition model to acquire to obtain a plurality of candidate illustration frames corresponding to the image to be processed; In order to remove too small images, a candidate illustration frame with a width greater than or equal to the width of the target webpage illustration is filtered from the candidate illustration frames as the target webpage illustration frame.

10) Cuts the image to be processed according to the target webpage illustration frame to obtain a candidate picture; and then zooms in or zooms out the candidate picture according to a target width and a target height to obtain a target webpage illustration;

11) Places the target webpage illustration into a backup webpage illustration pool for subsequent usage in the webpage edition process.

In the present embodiment, through a depth learning algorithm for image detection and classification, it is possible to directly cut a target illustration suitable for the webpage illustration from the original natural scene image, so as to reduce the manual labelling while ensuring the availability of the target illustration, so that the time cost is reduced and the work efficiency is improved.

Embodiment 3

Figure 3:
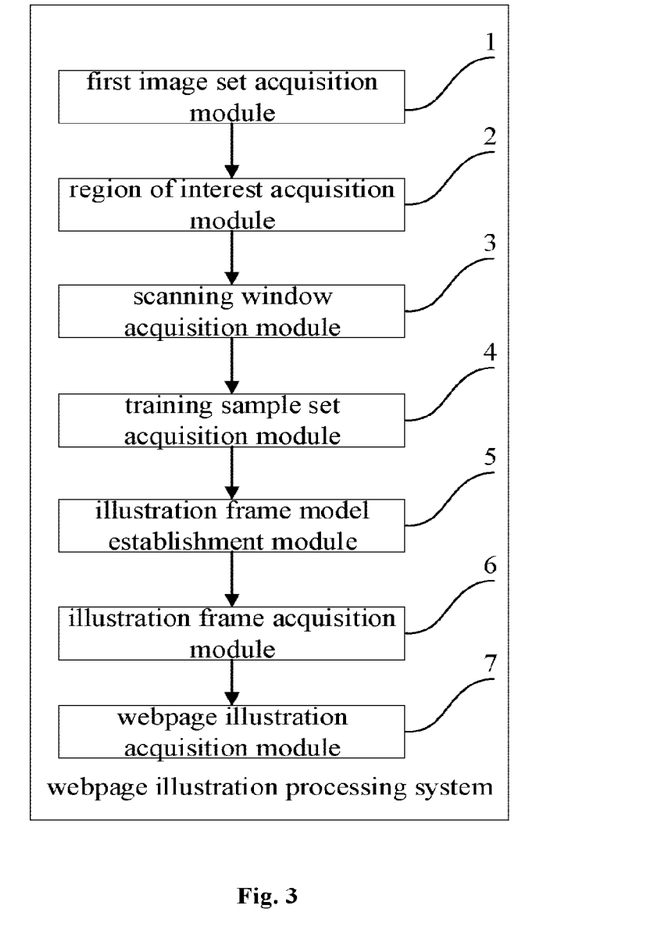
FIG. 3 is a block diagram of a webpage illustration processing system according to Embodiment 3 of the present disclosure.

As shown in FIG. 3, a webpage illustration processing system of the present embodiment comprises a first image set acquisition module 1, a region of interest acquisition module 2, a scanning window acquisition module 3, a training sample set acquisition module 4, an illustration frame model establishment module 5, an illustration frame acquisition module 6, and a webpage illustration acquisition module 7;

The first image set acquisition module 1 is used for acquiring a first image set corresponding to a product category;

Among them, the product category includes a variety of categories, such as "mobile phones", "dress", etc., which are provided to users as reference to purchase.

The region of interest acquisition module 2 is used for labelling at least one region of interest for each image in the first image set, wherein each region of interest is used for representing an object;

Among them, the same object in the region of interest includes a face, mobile phone, dress, etc. in an image, and corresponding parameter information of each region of interest (such as the central coordinates, width, height of the region of interest, information about the category to which it belongs, etc.) is associated with images in the first image set, and the association result is stored into a disk or other storage system.

The scanning window acquisition module 3 is used for acquiring a scanning window;

The training sample set acquisition module 4 is used for using the scanning window to scan the regions of interest, acquiring scanning results, and placing the scanning results into a sample training set;

The illustration frame model establishment module 5 is used for establishing an illustration frame acquisition model by taking the first image set as input and taking the sample training set as output;

The illustration frame acquisition module 6 is used for acquiring an image to be processed, and using the illustration frame acquisition model to acquire a target webpage illustration frame corresponding to the image to be processed; and The webpage illustration acquisition module 7 is used for cutting the image to be processed according to the target webpage illustration frame so as to obtain a target webpage illustration.

The webpage illustration processing method in the present embodiment belongs to an end-to-end (i.e., from an original natural scence image to a target webpage illustration) image processing method, that is, through a depth learning algorithm for image detection and classification, it is possible to directly cut a target illustration with fixed size suitable for the webpage illustration from the original natural scene image, so as to reduce the step of manual labelling while ensuring the availability of the target illustration, so that the time cost is reduced and the work efficiency is improved.

Embodiment 4

Figure 4:
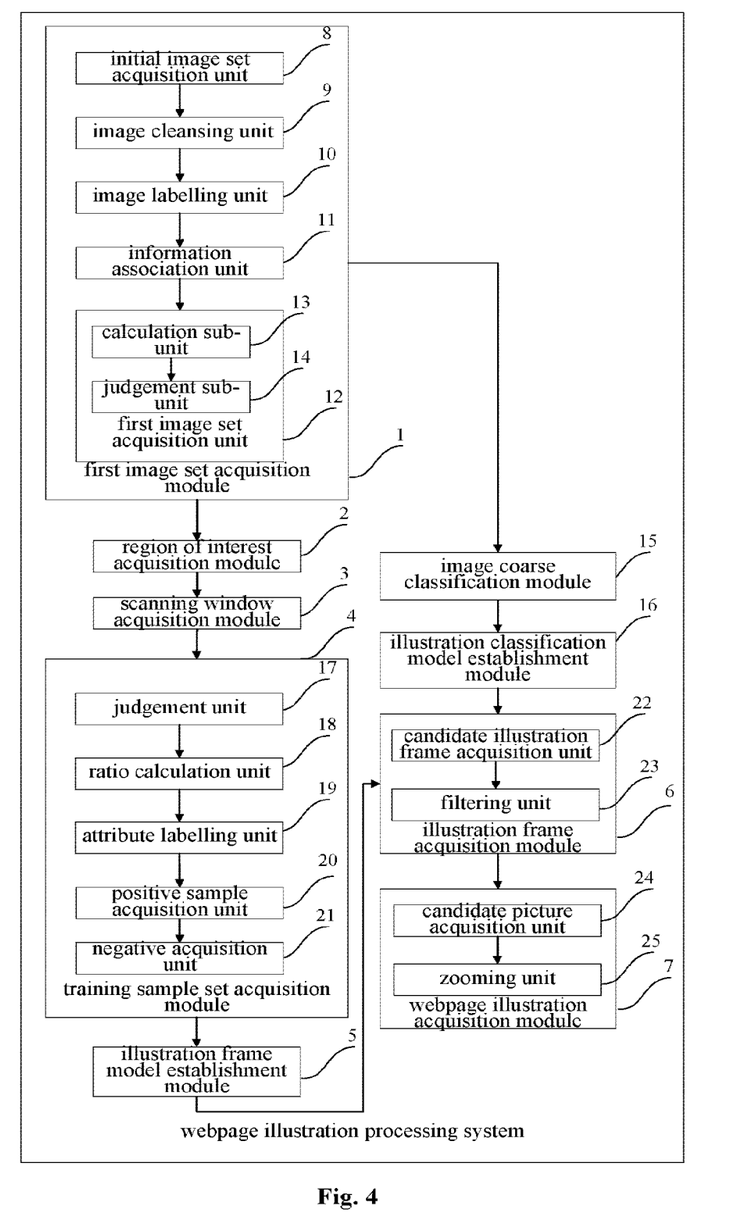
FIG. 4 is a block diagram of a webpage illustration processing system according to Embodiment 4 of the present disclosure.

As shown in FIG. 4, the webpage illustration processing system of the present embodiment further improves Embodiment 3, specifically:

The first image set acquisition module 1 comprises an initial image set acquisition unit 8, an image cleansing unit 9, an image labelling unit 10, an information association unit 11 and a first image set acquisition unit 12;

The initial image set acquisition unit 8 is used for acquiring an initial image set;

The image cleansing unit 9 is used for cleansing images in the initial image set;

The image labelling unit 10 is used for labelling ID information of the cleansed images in the initial image set;

The information association unit 11 is used for associating the ID information with multi-dimensional information of the image, and the first image set acquisition unit 12 is invoked for acquiring the first image set corresponding to the product category based on the associated images;

wherein, the association result is stored into a disk or another storage system;

The multi-dimensional information includes the product category to which the image belongs, width, height, storage position, source information, and so on.

When the multi-dimensional information comprises the product category to which the image belongs, the first image set acquisition unit 12 comprises a calculation sub-unit 13 and a judgement sub-unit 14;

The calculation sub-unit 13 is used for calculating a first ratio of the number of images in the initial image set belonging to the product category to the total number of images in the initial image set;

The judgement sub-unit 14 is used for judging whether the first ratio exceeds the first set threshold or not, and if it exceeds, selecting the images of the product category as the first image set.

The processing system further comprises an image coarse classification module 15 and an illustration classification model establishment module 16;

The image coarse classification module 15 is used for classifying the images in the first image set coarsely to obtain classification results;

wherein, classification conditions for the coarse classification include, not being limited to, being suitable for webpage illustration, being not suitable for webpage illustration and belonging to a white background image;

An image being not suitable for webpage illustration includes, not being limited to, an image completely irrelevant to the product category, an image with obvious post-processing effects, an image including illegal contents such as eroticism, violence, etc.

The illustration classification model establishment module 16 is used for establishing an illustration classification model by taking the images in the initial image set as input and taking the classification results as output;

Specifically, the illustration classification model is established by employing a neural network algorithm and taking the images in the initial image set as input, taking the classification result as output, wherein the establishment of illustration classification model is implemented based on a software framework in the neural network algorithm such as Tensorflow, Pytorch, Caffee, SQUEEZENET, VGG and so on, and a hardware framework such as CPU, GPU, FPGA, dedicated AI calculation chip and so on, and each illustration classification model classifies only one product category of images.

In addition, the scanning window includes a plurality of target scanning windows having the same aspect ratios and different sizes, and the target scanning window has the same aspect ratio as that of the target webpage illustration.

The target scanning windows of different sizes traverse the regions of interest in the images in the first image set along a set scanning path in a set scanning step.

The training sample set acquisition module 4 comprises a judgement unit 17, a ratio calculation unit 18, an attribute labelling unit 19, a positive sample acquisition unit 20 and a negative acquisition unit 21;

The judgement unit 17 is used for judging whether the region of interest corresponds to the product category or not; and if not, continuing to scan the next region of interest;

For example, when the product category is "mobile phone", if the object in the region of interest is a mobile phone, it is determined whether the region of interest corresponds to the product category or not. If the object in the region of interest is a face, it is determined whether the region of interest does not correspond to the product category or not.

If so, a ratio calculation unit 18 is invoked for calculating a second ratio of the area of intersection between the target scanning window and the region of interest to the area of the region of interest, and when the second ratio is greater than or equal to a second set threshold, then the attribute labelling unit is invoked for labelling the region of interest as a first attribute; when the second ratio is smaller than the second set threshold and greater than zero, then the attribute labelling unit is invoked for labelling the region of interest as a second attribute; when the second ratio is zero, the attribute labelling unit is invoked for labelling the region of interest as a third attribute;

Wherein the second set threshold can be specifically configured according to actual needs, and the configuration files are saved into a corresponding disk or another storage system.

The positive sample acquisition unit 20 is used for when there is at least one region of interest corresponding to the first attribute but no region of interest corresponding to the second attribute in the images in the first image set, taking parameter values of the target scanning window as positive samples;

The negative sample acquisition unit 21 is used for when there is at least one region of interest corresponding to the second attribute in the images in the first image set, taking parameter values of the target scanning window as negative samples;

wherein, the parameter values include central coordinates, width, and height of the target scanning window;

A plurality of the positive samples constitute a positive sample set, and a plurality of the negative samples constitute a negative sample set, the positive set and the negative set constitute the sample training set.

In addition, the processing system comprises a number calculation module and a sample excluding module;

The number calculation module is used for calculating a first number of the positive samples in the positive sample set and a second number of the negative samples in the negative sample set;

The sample excluding module is used for when the first number is larger than a third set threshold, excluding a first set number of the positive samples randomly, until the first number is less than or equal to the third set threshold;

The sample excluding module is further used for when the second number is larger than the third set threshold, excluding a second set number of the positive samples randomly, until the second number is less than or equal to the third set threshold.

The illustration frame model establishment module 5 establishes the illustration frame acquisition model by utilizing a target detection algorithm with taking the first image set as input and taking the sample training set as output.

The processing system further comprises a correction module which is used for correcting the target detection algorithm so that the illustration frame acquisition model outputs an illustration frame with the same aspect ratio as that of the target webpage illustration, thereby ensuring that zooming the cut image does not result in image deformation.

The target detection algorithms include, but are not limited to, FASTER-RCNN algorithm (a machine learning algorithm), and by setting the maximum number of model training rounds (the specific number of training rounds can be accordingly set according to the characteristics of the actual image set), taking the first image set as input, taking the sample training set as output, and based on a software framework in the neural network algorithm such as Tensorflow, Pytorch, Caffee, SQUEEZENET, VGG and so on, a hardware framework such as CPU, GPU, FPGA, dedicated AI calculation chip and so on, the illustration frame acquisition model is established.

The illustration frame acquisition module 6 comprises a candidate illustration frame acquisition unit 22 and a filtering unit 23;

The candidate illustration frame acquisition unit 22 is used for acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed;

That is, after the illustration classification model confirms the image to be processed is suitable for an image for webpage illustration, the image to be processed is cut subsequently to obtain the target webpage illustration, so that the efficiency and processing speed of acquiring the target illustration webpage illustration can be improved effectively.

The filtering unit 23 is used for filtering a candidate illustration frame with a width greater than or equal to the width of the target webpage illustration from candidate illustration frames as the target webpage illustration frame.

Among them, the corresponding central coordinates, width, height of each target webpage illustration frame are associated with ID information about the image to be processed.

Taking into account that the image cut by means of the candidate illustration frame which is too small, may become too blur after amplification and is not suitable for the target webpage illustration, it needs to delete the images with too small width.

The webpage illustration acquisition module 7 comprises a candidate picture acquisition unit 24 and a zooming unit 25;

The candidate picture acquisition unit 24 is used for cutting the image to be processed according to the target webpage illustration frame to obtain a candidate picture;

The zooming unit 25 is used for zooming in or zooming out the candidate picture to obtain the target webpage illustration with a target width and a target height.

In addition, the target webpage illustration is intended to be stored in the disk or another storage system, that is, is put into a backup webpage illustration pool for usage in the subsequent webpage edition process.

The ID information corresponding to each target webpage illustration is labeled, and the ID information corresponding to target webpage illustrations and the information associated with their save paths are stored in the disk or another storage system.

Hereinafter specific description will be presented in combination with examples:

1) Use the product category (such as "Mobile phone", "Dress", etc.) as a search condition, crawl and download related images from web pages in a specific web site, or purchase and download natural scence images of related product categories from websites such as photography and so on, and record the link to an original web page corresponding to each image and its source information (for example, records the image originates from a certain website), forming an initial image set, i.e. an image material library.

2) Cleanse each image in the initial image set, for example: deleting an image in the initial image set whose aspect ratio is too large or too small, deleting an image in the initial image set whose width is smaller than a first set pixel distance (which can be set depending on a specific situation), deleting an image in the initial image set whose height is less than a second set pixel distance (which can be set depending on a specific situation), deleting a error image that cannot be opened normally, and utilizing a hash signature algorithm (such as a MD5 message summary algorithm, etc.) to process the images in the initial image set, deleting a plurality of same images from the initial image set and remaining only one corresponding image.

3) Label the ID information about the cleansed images in the initial image set, and associate the ID information with the product category to which the images belongs, width, height, storage location, and source information of the images, etc.;

4) Pick out all images in the initial image set belonging to a product category whose proportion exceeds a first set threshold (such as 10%) to constitute a first image set.

5) Coarsely classify the images in the first image set according to be suitable for webpage illustration, be not suitable from webpage illustration, and belong to the white background image, and obtains classification results;

An illustration classification model is established by taking the images in the initial image as input and taking the classification results as output;

6) Label a region of interest in each image in the first image set which represents the same object (face, mobile phone, dress, etc.);

7) Select a target scanning window from a plurality of target scanning windows to scan the regions of interest in all images in the first image set:

For example: assuming that a target webpage illustration has a width of W and a height of H, a target scanning window has a weight of $W_1 = W*f$ and a height of $H_1 = H*f$; an image removed from the first image set is M (its width is T, the height is G); the initial coordinates of the target scanning window are $(W_1/2, H_1/2)$, the endpoint coordinates of the target scanning window are $(T-W_1/2, G-H_1/2)$, and the scanning step is a 2-pixel distance (the scanning step can be set according to the actual situation).

Assuming the current goal is to acquire a target webpage illustration related to a mobile phone, it is judged whether a region of interest in the current image corresponds to the mobile phone, and if not, continue to scan the next region of interest;

If is, it is calculated when the target scanning window F scans the region of interest C, each second ratio v of the area of intersection Q between the target scanning window F and the region of interest C to the area of the region of interest C, and if $v \leq 0.75$, the region of interest in the current image is labeled as "positive" attribute, if $0 < v < 0.75$, the region of interest in the current image is labeled as "negative" attribute, and if $v=0$, the region of interest in the current image is labeled as "no care" attribute.

It is judged that after the current target scanning window F scans all images in the first image set, whether attributes corresponding to all regions of interest C in the image have the "negative" attribute, if have, the central coordinates, width and height of the target scanning window F are taken as negative samples; if attributes corresponding to all regions of interest C in the image have no "negative" attribute and are not all "no care" attributes, the central coordinates, width and height of the target scanning window F are taken as positive samples; and if attributes corresponding to all regions of interest C in the image each is the "no care" attribute, the target scanning window F is discarded, that is, not a positive sample nor a negative sample.

In addition, if all of the regions of interest in the current image each does not correspond to the product category, the target scanning window F is discarded, that is, not a positive sample nor a negative sample.

It continues to employ each of the remaining target scanning windows to traverse the regions of interest in all images in the first image one by one, and finally acquires all positive samples as a positive sample set, and acquires all negative samples as a negative sample set.

In addition, when the positive samples in the positive sample set and the negative samples in the negative sample set is excessive (such as >300), it needs to randomly eliminate some positive samples in the positive sample set and some negative samples in the negative sample set, so that the positive samples in the positive sample set and the negative samples in the negative sample set each is less than 300 to ensure the data processing speed.

The positive sample set, negative sample set, and ID information about images in the first image set are associated and stored into a disk or another storage system.

8) Modify the target detection algorithm (such as the Faster-RCNN algorithm) to ensure that the illustration frame acquisition model outputs an illustration frame having the same aspect ratio as that of the target webpage illustration, and can output multiple candidate illustration frames having different size and the same aspect ratio; for example: when the target detection algorithm is not corrected, the correction parameters corresponding to the illustration frame output from the illustration frame acquisition model are: the central coordinate offset parameter $(\Delta x, \Delta y)$, width and height correction parameter $(\Delta w, \Delta h)$, and after the target detection algorithm is corrected, the correction parameters corresponding to the candidate illustration frame output from the illustration frame acquisition model are: the central coordinate offset parameter (Δx, Δy), the width and height correction parameter is (ΔW, (1/J)*Δw), J is the target aspect ratio coefficient, so that the corrected change amount for the height portion automatically changes to the target aspect ratio coefficient multiplied by the corrected change amount for width, thereby ensuring the candidate frame output from the illustration frame acquisition model, after correction, can meet the aspect ratio of the target webpage illustration.

In addition, the candidate illustration frame acquisition model is saved to a disk or another storage system.

9) when acquiring an image to be processed, inputting the image to be processed into the illustration classification model, and when the illustration classification model outputs the image to be processed as an image suitable for webpage illustration, inputting the image to be processed into the illustration frame acquisition model to acquire a plurality of candidate illustration frames corresponding to the image to be processed;

In order to remove too small images, filtering a candidate illustration frame with a width greater than or equal to the width of the target webpage illustration from candidate illustration frames as the target webpage illustration frame.

10) Cutting the image to be processed according to the target webpage illustration frame to obtain a candidate picture; and then zooming in or zooming out the candidate picture according to a target width and a target height to obtain a target webpage illustration;

11) Placing the target webpage illustration into a backup webpage illustration pool for t usage in the subsequent webpage edition process.

In the present embodiment, through a depth learning algorithm for image detection and classification, it is possible to directly cut a target illustration suitable for the webpage illustration from the original natural scene image, so as to reduce the manual labelling while ensuring the availability of the target illustration, so that the time cost is reduced and the work efficiency is improved.

Embodiment 5

Figure 5:
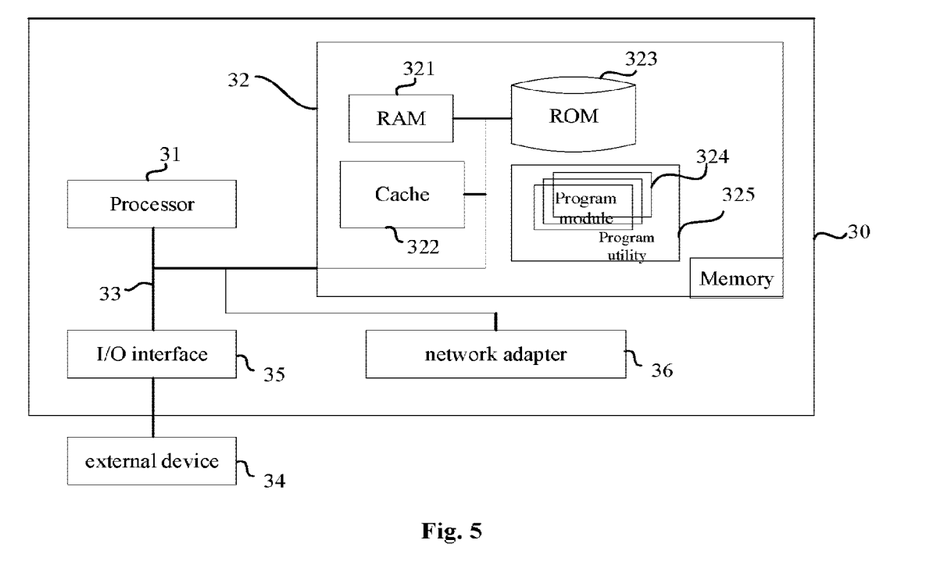
FIG. 5 is a schematic structural diagram of an electronic device for a webpage illustration processing method according to Embodiment 5 of the present disclosure.

FIG. 5 is a schematic structural view of an electronic device provided by Embodiment 7 of the present disclosure. The electronic device includes a memory, a processor, and a computer program stored on the memory which can run on the processor, the processor, when running the program, can implement the webpage illustration processing method in any of Embodiments 1 and 2. The electronic device 30 shown in FIG. 5 is merely an example, and the function and the application usage range of the embodiments of the present disclosure shall not be limited specifically.

As shown in FIG. 5, the electronic device 30 can be embodied in the form of a general-purpose computing device, for example, it can be a server device. The components of the electronic device 30 may include, but not limited to, at least one processor 31 described above, at least one memory 32, a bus 33 that connects different system components (including memory 32, and processor 31).

Bus 33 includes data bus, address bus, and control bus.

Memory 32 can include a volatile memory, such as a random access memory (RAM) 321, and/or a cache 322, and can further include a read only memory (ROM) 323.

Memory 32 may also include a program/utility 325 having a set (at least one) of program modules 324, including but not limited to: an operating system, one or more applications, other program modules, and program data, each or some combination of the examples may include an implementation of a network environment.

The processor 31 performs various functional applications and data processing, such as the webpage illustration processing method in any of embodiments 1 or 2 according to the present disclosure, by running a computer program stored in the memory 32.

The electronic device 30 can also communicate with one or more external devices 34 (eg, a keyboard, pointing device, etc.). Such communication can be performed via input/output (I/O) interface 35. Also, the device 30 for model generation can also communicate with one or more networks (e.g., local area network (LAN), wide area network (WAN), and/or public networks, such as the Internet) via the network adapter 36. As shown in FIG. 5, the network adapter 36 communicates with other modules in the device 30 for model generation via the bus 33. It should be understood that although not shown in the figure, the device 30 for model generation can utilized in combination with other hardwares and/or softwares, including, but not limited to, microcode, device driver, redundant processor, external disk drive array, RAID (disk array) system, tape drive, and data backup storage system, etc.

It should be noted that although several units/modules or sub-units/modules of the electronic device are mentioned in the above detailed description, this division is merely an exemplary, instead of being not mandatory. In fact, according to an embodiment of the present disclosure, the features and functions of the two or more unit/modules as described above may be embodied in one unit/module. Conversely, the features and functions of one unit/module as described above may be further divided into a plurality of unit/modules.

Embodiment 6

This embodiment provides a computer readable storage medium that stores a computer program thereon, and the program, when executed by a process, implements the webpage illustration processing method in any of embodiments 1 or 2.

Among them, more specifically, the readable storage medium that can be used may include, but not limited to: portable disc, hard disk, random access memory, read-only memory, erasable programmable read only memory, optical storage, magnetic storage device, or any suitable combination thereof.

In a possible implementation, the present disclosure can also be implemented in the form of a program product, including program codes, which when running on a terminal device cause the terminal device to perform steps in the webpage illustration processing method in any of embodiments 1 or 2.

Among them, the program codes for implementing the present disclosure can be written in any combination of one or more programming languages, and the program code can be executed completely on the user equipment, executed partially on the user equipment, executed as a separate software package, executed partially on the user equipment and partially on a remote device, or executed completely on the remote device.

Although specific embodiments of the disclosure have been described above, those skilled in the art will appreciate that these are illustrative only, and many modifications or amendents of these embodiments can be made without departing from the principles and substances of the disclosure. Therefore, the scope of the disclosure is defined by the appended claims.

What is claimed is:

1. A webpage illustration processing method, wherein the processing method comprises:
   acquiring a first image set corresponding to a product category;
   labelling at least one region of interest for each image in the first image set, wherein each region of interest is used for representing an object;
   acquiring a scanning window;
   using the scanning window to scan the regions of interest, acquiring scanning results, and placing the scanning results into a sample training set;
   establishing an illustration frame acquisition model by taking the first image set as input and taking the sample training set as output;
   acquiring an image to be processed, and employing the illustration frame acquisition model to acquire a target webpage illustration frame corresponding to the image to be processed; and
   cutting the image to be processed according to the target webpage illustration frame so as to obtain a target webpage illustration, wherein
   the scanning window includes a plurality of target scanning windows having the same aspect ratio and different sizes, and
   the target scanning windows have the same aspect ratio as that of the target webpage illustration.

2. The webpage illustration processing method of claim 1, wherein the step of acquiring a first image set corresponding to a product category comprises:
   acquiring an initial image set;
   cleansing images in the initial image set;
   labelling ID information of the cleansed images in the initial image set; and
   associating the ID information with multi-dimensional information of the images, and acquiring the first image set corresponding to the product category based on the associated images; and
   wherein, the multi-dimensional information includes at least one of the product category to which the images belong, width, height, storage position, and source information.

3. The webpage illustration processing method of claim 2, wherein, when the multi-dimensional information comprises the product category to which the image belong, the step of acquiring the first image set corresponding to the product category based on the associated images comprises:
   calculating a first ratio of a number of images in the initial image set belonging to the product category to a total number of images in the initial image set;
   judging whether the first ratio exceeds a first set threshold or not, and
   if it exceeds, selecting the images of the product category as the first image set.

4. The webpage illustration processing method of claim 1, wherein
   the step of using the scanning window to scan the regions of interest, acquiring scanning results, and placing the scanning results into a sample training set comprises:
   using each of the target scanning windows to scan the regions of interest in images in the first image set, acquiring scanning results, and placing the scanning results into a sample training set.

5. The webpage illustration processing method of claim 4, wherein the step of using each of the target scanning windows to scan the regions of interest in images in the first image set, acquiring scanning results, and placing the scanning results into a sample training set comprises:
   judging whether the region of interest corresponds to the product category or not;
   if not, continuing to scan the next region of interest; and
   if so, calculating a second ratio of an area of intersection between the target scanning window and the region of interest to an area of the region of interest, and when the second ratio is greater than or equal to a second set threshold, then labelling the region of interest as a first attribute; when the second ratio is smaller than the second set threshold and greater than zero, then labelling the region of interest as a second attribute;
   when there is at least one of regions of interest corresponding to the first attribute but no region of interest corresponding to the second attribute in the images in the first image set, taking parameter values of the target scanning window as positive samples; when there is at least one of regions of interest corresponding to the second attribute in the images in the first image set, taking parameter values of the target scanning window as negative samples; wherein the parameter values include central coordinates, width, and height of the target scanning window; a plurality of the positive samples constitute a positive sample set, and a plurality of the negative samples constitute a negative sample set, the positive sample set and the negative sample set constitute the sample training set, or
   the target scanning windows of the different sizes traverse the regions of interest in the images in the first image set along a set scanning path in a set scanning step.

6. The webpage illustration processing method of claim 5, wherein the processing method further comprises:
   calculating a first number of the positive samples in the positive sample set and a second number of the negative samples in the negative sample set;
   when the first number is larger than a third set threshold, excluding a first set number of the positive samples randomly, until the first number is less than or equal to the third set threshold; and
   when the second number is larger than the third set threshold, excluding a second set number of the negative samples randomly, until the second number is less than or equal to the third set threshold.

7. The webpage illustration processing method of claim 1, wherein
   the step of establishing an illustration frame acquisition model by taking the first image set as input and taking the sample training set as output comprises: establishing the illustration frame acquisition model by utilizing a target detection algorithm with taking the first image set as input and taking the sample training set as output; or
   the step of acquiring the target webpage illustration corresponding to the image to be processed according to the target webpage illustration frame includes:
   cutting the image to be processed according to the target webpage illustration frame to obtain a candidate picture; and
   zooming in or zooming out the candidate picture to obtain the target webpage illustration with a target width and a target height.

8. The webpage illustration processing method of claim 7, wherein, after the step of establishing the illustration frame acquisition model by utilizing a target detection algorithm with taking the first image set as input and taking the sample training set as output, the method further comprises:

correcting the target detection algorithm so that the illustration frame acquisition model outputs an illustration frame with the same aspect ratio as that of the target webpage illustration.

9. The webpage illustration processing method of claim 2, wherein, after the step of acquiring the first image set corresponding to the product category based on the associated images, the method further comprises:
classifying the images in the first image set coarsely to obtain classification results, classification conditions for the coarse classification including being suitable for webpage illustration, being not suitable for webpage illustration, and belonging to a white background image;
establishing an illustration classification model by taking the images in the initial image set as input and taking the classification results as output;
the step of acquiring an image to be processed, and using the illustration frame acquisition model to acquire a target webpage illustration frame corresponding to the image to be processed comprise:
acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed; and
filtering a candidate illustration frame with a width greater than or equal to the width of the target webpage illustration from candidate illustration frames as the target webpage illustration frame.

10. An electronic device, including a memory, a processor, and a computer program which is stored on the memory and runs on the processor, wherein the processor executes the computer program to implement a webpage illustration processing method comprising:
acquiring a first image set corresponding to a product category;
labelling at least one region of interest for each image in the first image set, wherein each region of interest is used for representing an object;
acquiring a scanning window;
using the scanning window to scan the regions of interest, acquiring scanning results, and placing the scanning results into a sample training set;
establishing an illustration frame acquisition model by taking the first image set as input and taking the sample training set as output;
acquiring an image to be processed, and employing the illustration frame acquisition model to acquire a target webpage illustration frame corresponding to the image to be processed; and
cutting the image to be processed according to the target webpage illustration frame so as to obtain a target webpage illustration, wherein
the scanning window includes a plurality of target scanning windows having the same aspect ratio and different sizes, and
the target scanning windows have the same aspect ratio as that of the target webpage illustration.

11. The electronic device of claim 10, wherein the acquiring a first image set corresponding to a product category comprises:
acquiring an initial image set;
cleansing images in the initial image set;
labelling ID information of the cleansed images in the initial image set; and
associating the ID information with multi-dimensional information of the images, and acquiring the first image set corresponding to the product category based on the associated images; and
wherein, the multi-dimensional information includes at least one of the product category to which the images belong, width, height, storage position, and source information.

12. The electronic device of claim 11, wherein when the multi-dimensional information comprises the product category to which the image belongs, the acquiring a first image set corresponding to a product category comprises:
calculating a first ratio of a number of images in the initial image set belonging to the product category to a total number of images in the initial image set;
judging whether the first ratio exceeds a first set threshold or not, and
if it exceeds, selecting the images of the product category as the first image set.

13. The electronic device of claim 10, wherein
the using the scanning window to scan the regions of interest, acquiring scanning results, and placing the scanning results into a sample training set comprises:
using each of the target scanning windows to scan the regions of interest in images in the first image set, acquiring scanning results, and placing the scanning results into a sample training set.

14. The electronic device of claim 10, wherein
the establishing an illustration frame acquisition model by taking the first image set as input and taking the sample training set as output comprises: establishing the illustration frame acquisition model by utilizing a target detection algorithm with taking the first image set as input and taking the sample training set as output; or
the acquiring the target webpage illustration corresponding to the image to be processed according to the target webpage illustration frame includes:
cutting the image to be processed according to the target webpage illustration frame to obtain a candidate picture; and
zooming in or zooming out the candidate picture to obtain the target webpage illustration with a target width and a target height.

15. The electronic device of claim 11, wherein, after the acquiring the first image set corresponding to the product category based on the associated images, the processor executes the computer program to implement:
classifying the images in the first image set coarsely to obtain classification results, classification conditions for the coarse classification including being suitable for webpage illustration, being not suitable for webpage illustration and belonging to a white background image;
establishing an illustration classification model by taking the images in the initial image set as input and taking the classification results as output;
the acquiring an image to be processed, and using the illustration frame acquisition model to acquire a target webpage illustration frame corresponding to the image to be processed comprise:
acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed; and filtering a candidate illustration frame with a width greater than or equal to the width of the target webpage illustration from candidate illustration frames as the target webpage illustration frame.

16. A non-transitory computer readable storage medium storing a computer program thereon, wherein the computer program, when executed by a processor, implement a webpage illustration processing method comprising:

acquiring a first image set corresponding to a product category;

labelling at least one region of interest for each image in the first image set, wherein each region of interest is used for representing an object;

acquiring a scanning window;

using the scanning window to scan the regions of interest, acquiring scanning results, and placing the scanning results into a sample training set;

establishing an illustration frame acquisition model by taking the first image set as input and taking the sample training set as output;

acquiring an image to be processed, and employing the illustration frame acquisition model to acquire a target webpage illustration frame corresponding to the image to be processed; and cutting the image to be processed according to the target webpage illustration frame so as to obtain a target webpage illustration, wherein the scanning window includes a plurality of target scanning windows having the same aspect ratio and different sizes, and the target scanning windows have the same aspect ratio as that of the target webpage illustration.

17. The non-transitory computer readable storage medium of claim 16, wherein the acquiring a first image set corresponding to a product category comprises:
acquiring an initial image set;
cleansing images in the initial image set;
labelling ID information of the cleansed images in the initial image set;
associating the ID information with multi-dimensional information of the images, and acquiring the first image set corresponding to the product category based on the associated images; and
wherein, the multi-dimensional information includes at least one of the product category to which the images belong, width, height, storage position, and source information.

18. The non-transitory computer readable storage medium of claim 16, the using the scanning window to scan the regions of interest, acquiring scanning results, and placing the scanning results into a sample training set comprises:
using each of the target scanning windows to scan the regions of interest in images in the first image set, acquiring scanning results, and placing the scanning results into a sample training set.

19. The non-transitory computer readable storage medium of claim 16, wherein the establishing an illustration frame acquisition model by taking the first image set as input and taking the sample training set as output comprises: establishing the illustration frame acquisition model by utilizing a target detection algorithm with taking the first image set as input and taking the sample training set as output; or the acquiring the target webpage illustration corresponding to the image to be processed according to the target webpage illustration frame includes:
cutting the image to be processed according to the target webpage illustration frame to obtain a candidate picture; and
zooming in or zooming out the candidate picture to obtain the target webpage illustration with a target width and a target height.

20. The non-transitory computer readable storage medium of claim 17, wherein, after the acquiring the first image set corresponding to the product category based on the associated images, the processor executes the computer program to implement:

classifying the images in the first image set coarsely to obtain classification results, classification conditions for the coarse classification including being suitable for webpage illustration, being not suitable for webpage illustration and belonging to a white background image;

establishing an illustration classification model by taking the images in the initial image set as input and taking the classification results as output;

the acquiring an image to be processed, and using the illustration frame acquisition model to acquire a target webpage illustration frame corresponding to the image to be processed comprise:

acquiring the image to be processed, inputting the image to be processed into the illustration classification model, and when the illustration classification model outputs the image to be processed as an image suitable for webpage illustration, inputting the image to be processed into the illustration frame acquisition model to obtain a plurality of candidate illustration frames corresponding to the image to be processed; and filtering a candidate illustration frame with a width greater than or equal to the width of the target webpage illustration from candidate illustration frames as the target webpage illustration frame.

* * * * *